United States Patent [19]

Morton et al.

[11] 4,132,934

[45] Jan. 2, 1979

[54] ELECTRIC MOTOR DRIVEN VEHICLES

[75] Inventors: John Morton; Keith D. Stevens, both of Stockport, England

[73] Assignee: Cableform Limited, Stockport, England

[21] Appl. No.: 736,605

[22] Filed: Oct. 28, 1976

[51] Int. Cl.² .............................................. H02P 3/04
[52] U.S. Cl. .................................. 318/382; 318/363; 318/375; 318/377; 318/379
[58] Field of Search ............... 318/377, 378, 379, 381, 318/382, 362, 363, 364, 369, 375, 376

[56] References Cited

U.S. PATENT DOCUMENTS

| 2,627,597 | 2/1953 | Johansson | 318/369 |
| 3,569,811 | 3/1971 | Miller | 318/381 |

Primary Examiner—Robert K. Schaefer
Assistant Examiner—Leonard W. Pojunas, Jr.
Attorney, Agent, or Firm—Sughrue, Rothwell, Mion, Zinn and Macpeak

[57] ABSTRACT

A control arrangement is described for dynamically braking a vehicle driven by an electric motor having a single field winding. The control arrangement comprises means for controlling the supply of power to the motor, a permanent magnet generator for mechanically coupling to the motor, and circuit closure means arranged to complete a circuit between the output of the generator and the field winding to dynamically brake the motor when the motor is de-energized by the controlling means.

5 Claims, 1 Drawing Figure

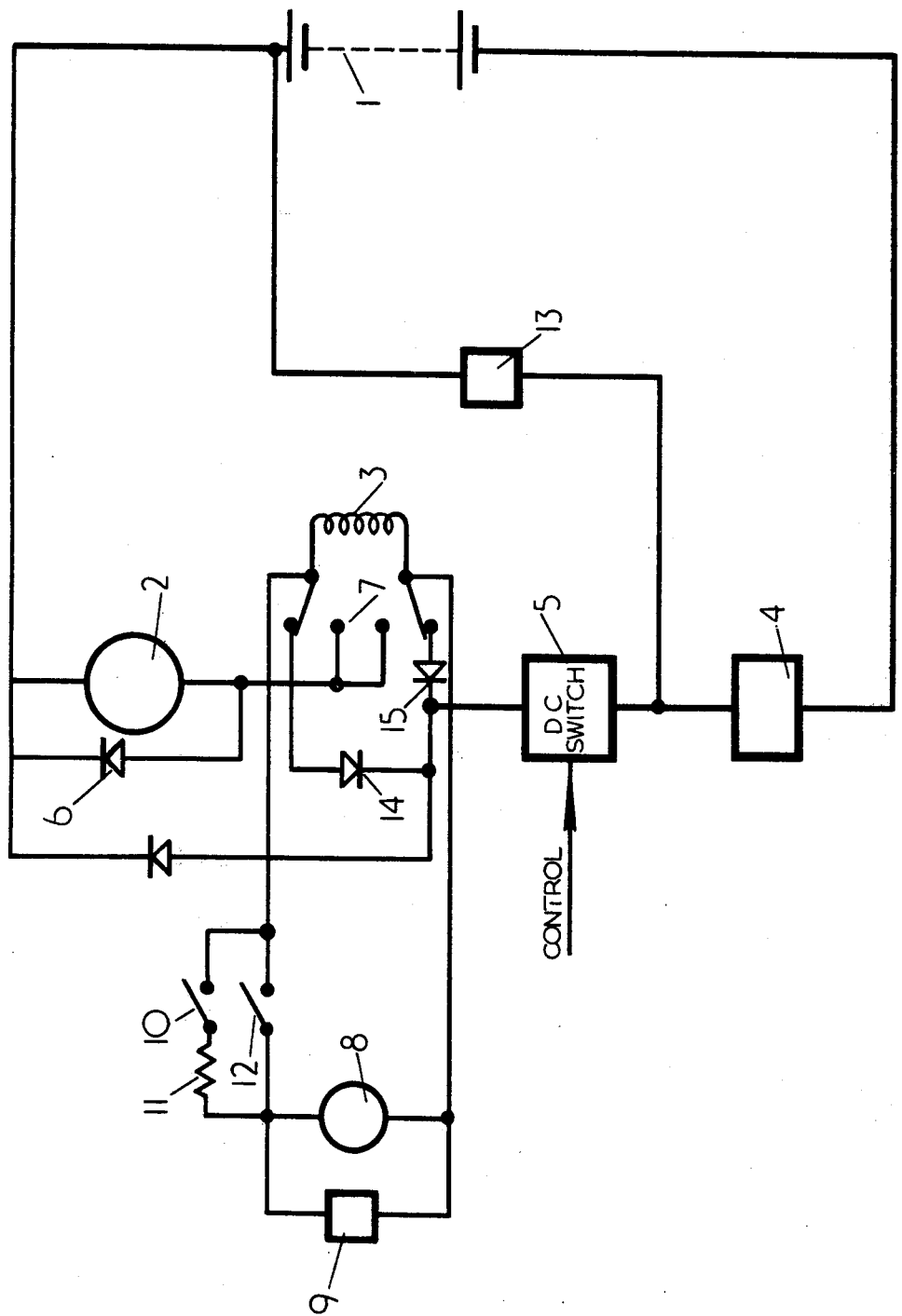

ELECTRIC MOTOR DRIVEN VEHICLES

This invention relates to control arrangements for vehicles driven by electric motors. Such motors are generally supplied with power from a battery via a D.C. switch which provides pulses of current. The frequency and/or mark-space ratio of the pulses is varied to vary then mean power supplied to the motor.

The variation of the mean power is under the control of the vehicle operator but with such vehicles as fork-lift trucks it is desirable to provide for dynamic braking of the truck in the event of the truck running away after having been left standing without adequate mechanical braking. It is also desirable to limit the speed which can be attained on downhill gradients, particularly when the truck is heavily loaded.

British patent specification No. 1,381,856 describes a control arrangement for dynamically braking a vehicle driven by an electric motor having a plurality of field windings.

In the described control arrangement a generator is mechanically coupled to the motor, and circuit closure means are arranged to complete a circuit between the output of the generator and one of the field windings when the motor is de-energised. Unfortunately the described arrangement cannot be used with a motor having only one field winding. It is an object of the present invention to provide a control arrangement for dynamically braking a vehicle driven by an electric motor having a single field winding.

According to the invention, there is provided a control arrangement for a vehicle driven by an electric motor having a single field winding, comprising means for controlling the supply of power to the motor, a permanent magnet generator for mechanically coupling to the motor, and circuit closure means arranged to complete a circuit between the output of the generator and the field winding to dynamically brake the motor when the motor is de-energised by the controlling means.

When the motor is de-energised for example as a result of the vehicle being left stationary with its power supply switched off or disconnected, any tendency for the vehicle to run away on a slope due to failure to set the manual parking brake correctly may be inhibited by dynamic braking, the vehicle at most creeping away very slowly.

Preferably, means are provided for sensing the output signal of the generator and for completing a circuit between the output of the generator and the said one motor field winding when the output signal reaches a predetermined value so that dynamic braking is applied to the motor.

An embodiment of the invention will now be described by way of example, with reference to the accompanying drawing, which is a schematic circuit diagram of a control arrangement in accordance with the invention.

The control arrangement shown in the accompanying drawing is installed in a fork-lift truck which is powered by a battery 1, the energy supplied to an electric drive motor 2, 3, of the truck being controlled by an ON/OFF switch and circuit protection contacts 4 and a D.C. switch 5 which is pulse controlled to vary the mean power to the motor. The armature 2 of the motor is shunted by a diode 6 which allows circulation of armature current during dynamic braking. The single field winding 3 is in series with the armature 2 through the intermediary of a reversing switch 7. The reversing switch 7 is shown in its neutral position. The motor may be energised in the forward direction by moving one of the contacts of the switch 7 to its alternative position, and in the reverse direction by moving the other contact of the switch 7.

A generator 8 is mechanically coupled for rotation with the motor, the output of the generator being taken to a relay 9 which, when the output reaches a predetermined level corresponding to the desired speed limit, closes contacts 10 and also automatically causes the switch 7 to assume the condition illustrated, thereby stopping the flow of current to the motor from the battery 1. The contacts 10 of the relay 9 are included in a circuit comprising the generator 8, the field winding 3 of the motor, and a resistance 11. When the contacts 10 close, the generator output alone is fed to the field winding 3 and is so connected as to provide dynamic braking to a degree determined by the resistance 11 in the circuit.

The control of the switch 7 by the relay 9 may be achieved by the relay 9 closing further contacts (not shown) and thereby energising a circuit for resetting the switch 7.

Irrespective of the truck operator, if the truck exceeds a predetermined speed, for example, on a downhill gradient, the relay 9 will close the contacts 10 and reset the switch 7 and dynamic braking will be applied to restrict the speed, the relay falling out again at a preset lower speed which may be zero. The polarity of the generator output is dependent upon the direction of rotation and therefore braking is applied irrespective of the direction of movement of the truck.

Additionally, across the resistance 11 and the relay contacts 10 there is provided a set of normally closed contacts 12 of a relay 13. The relay 13 is energised through the ON/OFF switch and circuit protection contacts shown diagrammatically at 4 when the truck is being operated so that the contacts 12 are open when the truck is in use. When the truck is left standing, either with the switch 4 turned to OFF or with its supply disconnected, the contacts 12 are closed so that the output of generator 8 is connected directly to the field winding 3. If, for some reason such as defective mechanical braking, the truck attempts to move away on a slope, the whole of the generator output is applied to the single field winding to give heavy dynamic braking, thereby preventing a run-away or at least reducing it to a low speed creep. As mentioned previously, this braking will be irrespective of direction of attempted travel of the truck.

Two diodes 14, 15 are provided to prevent shorting out of the field winding 3 and thus the output of the generator 8 as a result of the switch 7 being in the neutral position. If the switch 7 was replaced by a switch which did not short out the field winding 3 when in its neutral position, the diodes 14, 15 would not be required.

To provide adequate dynamic braking, it is necessary for the output of the generator 8 to be matched to the characteristics of the winding 3. For most motors a high current low voltage generator output is required, for example 4 volts, 25 amps.

What is claimed is:

1. A dynamic braking control arrangement for a vehicle driven by an electric motor having a single field winding, comprising: means for controlling the supply of power to the motor, a permanent magnet generator mechanically coupled to the motor, and continuously operable circuit closure means for automatically connecting the output of the generator to said single field winding to dynamically brake the motor when the motor is de-energised by the controlling means, said generator output constituting the sole and entire source of electrical energy supplied to said single field winding during dynamic braking.

2. A control arrangement according to claim 1, wherein said circuit closure means comprises means for sensing the output of the generator and for completing a circuit between the output of the generator and said single motor field winding to apply dynamic braking when the sensed output signal reaches a predetermined value.

3. A control arrangement according to claim 2, wherein said means for sensing comprises a relay connected across the generator, and said means for completing a circuit comprises contacts controlled by the relay closing to apply the output of the generator to said single field winding when the generator output reaches a predetermined level.

4. A control arrangement according to claim 1, comprising a relay arranged to be energised whenever the motor and power supply controlling means is connected to a power supply, which relay when de-energised closes contacts to apply the output of the generator to said single field winding.

5. A control arrangement according to claim 3, comprising a further relay arranged to be energised whenever the motor and power supply controlling means is connected to a power supply, which further relay when de-energised closes contacts to apply the output of the generator to said single field winding.

* * * * *

UNITED STATES PATENT AND TRADEMARK OFFICE
CERTIFICATE OF CORRECTION

PATENT NO. : 4,132,934

DATED : January 2, 1979

INVENTOR(S) : John MORTON et al

It is certified that error appears in the above-identified patent and that said Letters Patent are hereby corrected as shown below:

IN THE HEADING:

Foreign Application Priority Data:

Insert -- Nov. 28, 1975    Great Britain........48969/75 --

Signed and Sealed this

Twentieth Day of March 1979

[SEAL]

Attest:

RUTH C. MASON
Attesting Officer

DONALD W. BANNER
Commissioner of Patents and Trademarks